(12) United States Patent
Ehrhard et al.

(10) Patent No.: US 10,513,972 B2
(45) Date of Patent: *Dec. 24, 2019

(54) SUPERCHARGER DEVICE FOR AN INTERNAL COMBUSTION ENGINE, AND A METHOD FOR OPERATING SAID SUPERCHARGER DEVICE

(71) Applicant: CPT Group GmbH, Hannover (DE)

(72) Inventors: Jan Ehrhard, Wiesloch (DE); Nisar Al-Hasan, München (DE); Hong Zhang, Tegernheim (DE)

(73) Assignee: Vitesco Technologies GmbH, Hannover (DE)

( * ) Notice: Subject to any disclaimer, the term of this patent is extended or adjusted under 35 U.S.C. 154(b) by 63 days.

This patent is subject to a terminal disclaimer.

(21) Appl. No.: 15/609,717

(22) Filed: May 31, 2017

(65) Prior Publication Data

US 2017/0260897 A1    Sep. 14, 2017

Related U.S. Application Data

(63) Continuation of application No. PCT/EP2015/074694, filed on Oct. 26, 2015.

(30) Foreign Application Priority Data

Dec. 1, 2014   (DE) .................. 10 2014 224 474

(51) Int. Cl.
*F02B 37/14*   (2006.01)
*F02B 37/04*   (2006.01)
(Continued)

(52) U.S. Cl.
CPC .............. *F02B 37/14* (2013.01); *F02B 37/04* (2013.01); *F02B 37/164* (2013.01);
(Continued)

(58) Field of Classification Search
CPC .... F02B 37/001; F02B 37/004; F02B 37/005; F02B 37/007; F02B 37/013; F02B 37/10; F02B 37/14; F02B 37/164; F02B 39/10
See application file for complete search history.

(56) References Cited

U.S. PATENT DOCUMENTS 4,282,713 A    8/1981   Antoku et al.
6,318,085 B1   11/2001  Torno et al.
(Continued)

FOREIGN PATENT DOCUMENTS

CN    203730120 U    7/2014
DE     2823067 C2    7/1982
(Continued)

OTHER PUBLICATIONS

International Search Report and Written Opinion, dated Feb. 26, 2016, for corresponding PCT application PCT/EP2015/074694.
(Continued)

*Primary Examiner* — Ngoc T Nguyen

(57) ABSTRACT

A supercharger device for an internal combustion engine, including an exhaust gas turbocharger and a recuperation charger having a compressor turbine and an electromechanical motor-generator coupled thereto. The compressor turbine is connectable on the low-pressure side thereof to a charge air supply line and on the high-pressure side of the compressor turbine to both the charge air supply line and an exhaust gas tract of the engine. The recuperation charger is able to be switched at least between a booster operative mode and a recuperation operative mode. The recuperation charger may be operated as a compressor driven by the motor-generator for increasing pressure in the charge air supply line in the booster operative mode, or driven by at least a portion of a charge air mass flow, the exhaust gas
(Continued)

mass flow, or both, and operated as a turbine so as to recover energy by the motor-generator.

16 Claims, 6 Drawing Sheets

(51) Int. Cl.
  *F02B 37/16* (2006.01)
  *F02B 39/10* (2006.01)
  *F02B 37/22* (2006.01)
(52) U.S. Cl.
  CPC ............ *F02B 37/225* (2013.01); *F02B 39/10* (2013.01); *Y02T 10/144* (2013.01)

(56) References Cited

U.S. PATENT DOCUMENTS

| | | |
|---|---|---|
| 9,163,555 B2 | 10/2015 | McConville et al. |
| 2001/0054287 A1 | 12/2001 | Hoecker et al. |
| 2011/0209473 A1 | 9/2011 | Fritz et al. |
| 2014/0157774 A1 | 6/2014 | McConville et al. |
| 2014/0325981 A1 | 11/2014 | Rabhi |
| 2016/0108799 A1 | 4/2016 | Stoffels et al. |
| 2016/0195047 A1* | 7/2016 | Carter .............. F02M 35/10157 60/605.1 |
| 2017/0198631 A1* | 7/2017 | Zhang .................... F02B 37/005 |
| 2017/0241328 A1* | 8/2017 | Ehrhard ........... F02M 35/10255 |

FOREIGN PATENT DOCUMENTS

| | | |
|---|---|---|
| DE | 19712850 A1 | 10/1998 |
| DE | 10023022 | 11/2001 |
| DE | 102007057224 A1 | 1/2009 |
| DE | 102011018570 A1 | 10/2012 |
| DE | 202014105279 U1 | 11/2014 |
| JP | 2007077854 A | 3/2007 |

OTHER PUBLICATIONS

DE OA dated Oct. 22, 2015 of corresponding German patent application 10 2014 224 474.9.
English Abstract of DE 10 2011 018 570 A1.
English Abstract of JP 2007077854.
English Abstract of DE 10 2007 057 224 A1.
China Office Action dated Oct. 18, 2018 for corresponding Chinese Patent Application No. 201580065426.8.

* cited by examiner

SUPERCHARGER DEVICE FOR AN INTERNAL COMBUSTION ENGINE, AND A METHOD FOR OPERATING SAID SUPERCHARGER DEVICE

CROSS REFERENCE TO RELATED APPLICATIONS

This application claims the benefit of International application No. PCT/EP2015/074694, filed Oct. 26, 2015, which claims priority to German patent application No. 10 2014 224 474.9, filed Dec. 1, 2014, each of which are hereby incorporated by reference herein.

FIELD OF INVENTION

The invention relates to a supercharging device for an internal combustion engine having an exhaust-gas turbocharger, and to an operating method for the supercharging device.

BACKGROUND

Exhaust-gas turbochargers are increasingly used for increasing power in internal combustion engines, in particular in motor vehicles. This is done ever more commonly with the aim of reducing the structural size and weight of the internal combustion engine while maintaining the same level of power or even achieving an increased level of power, and at the same time reducing consumption and thus $CO_2$ emissions, in the context of ever more stringent legal regulations in this regard. The operating principle includes utilizing the energy contained in the exhaust-gas flow to increase the pressure in the intake tract of the internal combustion engine and thereby realize improved charging of the combustion chamber with air/oxygen to thus be able to convert more fuel, for example gasoline or diesel, per combustion process, that is to say increase the power of the internal combustion engine.

For this purpose, an exhaust-gas turbocharger has a turbine, which is arranged in the exhaust-gas tract of the internal combustion engine and which has a turbine rotor driven by the exhaust-gas flow, and a compressor, which is arranged in the intake tract and which has a compressor rotor which builds up the pressure. The turbine rotor and compressor rotor are fastened rotationally conjointly to the opposite ends of a rotor shaft and thus form the turbocharger rotor, which is rotatably mounted by means of its rotor shaft in a bearing unit arranged between turbine and compressor. Thus, by means of the exhaust-gas mass flow, the turbine rotor, and via the rotor shaft which is in turn the compressor rotor, is driven, and the exhaust gas energy is thus utilized for building up pressure in the intake tract.

Turbines and compressors are turbomachines and, owing to the laws of physics, have an optimum operating range in a manner respectively dependent on structural size and design, which optimum operating range is characterized by the mass throughput, the pressure ratio and the rotational speed of the respective rotor.

By contrast to this, the operation of an internal combustion engine in a motor vehicle is characterized by dynamic changes of the load and of the operating range.

To now be able to adapt the operating range of the exhaust-gas turbocharger to changing operating ranges of the internal combustion engine and thus ensure a desired response behavior as far as possible without noticeable decelerations (turbo lag), exhaust-gas turbochargers are equipped with additional functions, such as for example so-called variable turbine geometries (VTG) or wastegate devices (WG) on the exhaust-gas or turbine side and overrun air recirculation or blow-off devices on the air feed or compressor side. These serve for minimizing the inert behavior and thus the decelerated response behavior of the turbocharger and avoiding damaging operating states.

It is also known to use combinations of multiple turbochargers in a parallel or sequential arrangement or to use additional compressors which are operated mechanically or by electric motor, so-called supercharging blowers or superchargers, in order to cover the various operating conditions of the internal combustion engine, in order to efficiently increase the power in all rotational speed ranges and in particular during acceleration processes, and in particular to avoid the undesired turbo lag, which is caused by excessively low charge pressure in low rotational speed ranges of the turbocharger in conjunction with the inertia of the turbocharger rotor.

A supercharging device of this type, which has a conventional exhaust-gas turbocharger and an auxiliary compressor arranged in the fresh-air mass flow in series or in parallel with respect to the turbocharger compressor, which auxiliary compressor has a drive independent of the exhaust-gas flow, for example an electric motor drive, is disclosed, for example, in DE 100 23 022 A1.

By contrast, in operating phases in which the power of the internal combustion engine is decreased quickly, it is the case, likewise owing to the inertia of the turbocharger, that an excess of compressor power exists, which may lead to so-called compressor surging. Compressor surging refers to an operating state in which air that has already been compressed flows back from the high-pressure side of the compressor via the compressor rotor in periodic surges and thus generates undesired oscillations in the intake tract. To avoid such operating states, exhaust gas is conducted, so as to bypass the turbine of the turbocharger, into the exhaust-gas tract, for example by means of a wastegate device, and already-compressed fresh air is blown off downstream of the compressor or is expanded across an overrun air recirculation device and recirculated into the intake region. The arrangement and functioning of an overrun air recirculation valve of this type is known, for example, from documents DE 28 23 067 C2 and DE 197 12 850 A1.

In this way, the available energy is discharged, unutilized, into the surroundings, which has an adverse effect on the overall energy balance and thus on the efficiency of the internal combustion engine.

SUMMARY

Embodiments of the present invention are therefore based on specifying a supercharging device and an operating method therefor for an internal combustion engine, which are suitable both for assisting the build-up of charge pressure by the exhaust-gas turbocharger in acceleration or peak-load phases of the internal combustion engine and for utilizing, or making utilizable in the overall system of the motor vehicle, the excess energy in the supercharging system during braking or low-load phases of the internal combustion engine, and thereby increasing the efficiency of the internal combustion engine.

A corresponding internal combustion engine has an intake side, via which the engine draws in fresh air or a fuel-fresh air mixture, and an exhaust-gas side, via which the engine releases the exhaust gas that has been generated after combustion. An internal combustion engine of this type may be a single-cylinder or multi-cylinder reciprocating-piston engine which is operated with fuels such as, for example, gasoline, diesel and a combustible gas.

The supercharging device, according to embodiments of the invention, for an internal combustion engine which has an intake tract arranged on its intake side and an exhaust-gas tract arranged on its exhaust-gas side, has an exhaust-gas turbocharger having an exhaust-gas turbine, which is arranged in the exhaust-gas tract, and a fresh-air compressor having a low-pressure side and a high-pressure side, which is arranged in the intake tract.

The fresh-air compressor is connected, on the low-pressure side thereof, to a fresh-air supply device, and is connected, on the high-pressure side of the fresh-air compressor, via a charge-air feed line which serves for conducting a charge-air mass flow generated by the fresh-air compressor, to the intake side of the internal combustion engine, for example via a throttle flap valve and a charge-air manifold.

The supercharging device includes the additional arrangement of a recuperation charger which has a compressor-turbine with a high-pressure side and a low-pressure side and which has an electromechanical motor-generator coupled to the compressor-turbine. Here, the compressor-turbine, on one side, on the low-pressure side thereof, is coupled both to the charge-air feed line and to a blow-off line, and, on the other side, on the high-pressure side of the compressor-turbine, is coupled both to the charge-air feed line and to an exhaust-gas discharge line in the exhaust-gas tract, by line connections and valve devices. On the basis of this arrangement, the recuperation charger is operable in a manner dependent on the settings of the valve devices, at least in two different operating modes. One of the operating modes is a so-called booster operating mode in which the recuperation charger, in a manner driven by the motor-generator, acts as a compressor for increasing the pressure of the charge-air mass flow in the charge-air feed line. A second operating mode is a so-called recuperation operating mode, in which the recuperation charger is operable in a manner driven by at least a part of the charge-air mass flow or by at least a part of an exhaust-gas mass flow, or by at least a part of the charge-air mass flow and at least a part of an exhaust-gas mass flow jointly, as a turbine for energy recovery by the motor-generator.

Here, the expression "recuperation charger" is to be understood to mean a device which combines an impeller-type turbine with connected generator and an impeller-type compressor with connected electric motor in one device. Thus, an impeller-type turbine and an impeller-type compressor are combined using one rotor and in an associated housing to form as a unit what is referred to above and also below as a compressor-turbine.

Likewise, the electric motor and the generator are combined in one three-phase machine to form as a unit what is referred to above and also below as a motor-generator. The compressor-turbine and the motor-generator are coupled to one another directly or via an interposed gearing and form, as a unit, the recuperation charger.

In the compressor-turbine, use is made of the characteristic of impellers whereby, firstly, when impinged on by a flow of a fluid at elevated pressure from the high-pressure side, the impeller may act as a turbine and generate an output torque; and secondly, when driven by a drive torque, the impeller may itself generate a fluid flow with an increase of the pressure and thus act as a compressor. The corresponding impeller and the flow guidance in the rotor housing therefore, for the use as a compressor-turbine, allows for both intended uses. This may, in an advantageous refinement of the compressor-turbine, be enhanced by a fixed or variable arrangement of flow-guiding guide blades.

In the motor-generator, use is made of the characteristic of electric three-phase machines whereby, firstly, when a voltage and current is applied thereto, the machines may be operated as an electric motor with driving action and, secondly, when driven by an external torque, the machines may themselves generate voltage and output current. The corresponding three-phase machine for use as a motor-generator therefore allows for both intended uses.

The advantageous combination of compressor-turbine and motor-generator to form what is referred to above and also below as a recuperation charger advantageously permits operation of the compressor-turbine in both flow directions, specifically as a compressor in a booster operating mode when driven by electric motor action, or as a turbine so as to drive the generator in a recuperation operating mode. A further possibility includes switching the motor-generator into a neutral state, which corresponds to a freewheeling state of the compressor-turbine and may be utilized in what is referred to here and below as a standard operating mode.

An advantageously configured embodiment of the supercharging device includes the low-pressure side of the compressor-turbine being connected, via a low-pressure branch line and a first valve device, to the charge-air feed line at a first charge-air branching point. At the same time, the high-pressure side of the compressor-turbine is connected, at least via a high-pressure branch line and a second valve device, to the charge-air feed line at a second charge-air branching point downstream of the first charge-air branching point in the charge-air flow.

The low-pressure branch line is furthermore connected, at a low-pressure branching point, via the first valve device or a further valve device to a blow-off line.

The high-pressure branch line is connected, at a high-pressure branching point, via an exhaust-gas recirculation line and at least one third valve device to an exhaust-gas discharge line in the exhaust-gas tract at an exhaust-gas branching point. Here, the charge-air feed line may be shut off between the first charge-air branching point and the second charge-air branching point by the first or second valve device or at least one further valve device.

This configuration has the advantage that the supercharging device may be operated both in a booster operating mode for the purposes of increasing pressure in the intake tract and in at least one recuperation operating mode for the purposes of recovery of intermittently excess energy of the charge-air mass flow or of the exhaust-gas mass flow. This is made possible in that, through corresponding setting of the valve devices, it is firstly possible for the flow direction of the charge-air mass flow across the compressor-turbine to be particularly easily reversed, and secondly, at the same time, an exhaust-gas mass flow may be branched off from the exhaust-gas tract of the internal combustion engine and conducted simultaneously with the charge-air mass flow, or instead of the latter, to the compressor-turbine.

A further refinement of the supercharging device includes one or more charge-air coolers arranged at one or more positions in the charge-air feed line upstream or downstream of the compressor-turbine in the charge-air mass flow. This has an advantageous effect on the operating temperatures of the functional components arranged in the charge-air mass flow, and yields further improved charging of the cylinders of the internal combustion engine with oxygen.

In a further refinement of the supercharging device, the compressor-turbine of the recuperation charger has a compressor-turbine housing with, arranged therein, a fixed or variable guide blade arrangement for optimizing or improving the outflow behavior or inflow behavior of the charge-air mass flow. In particular, a variable guide blade arrangement offers the advantage that the power and efficiency of the compressor-turbine in the respective operating mode may be increased through adaptation of the flow direction of the charge-air mass flow, for example.

In the operating method according to embodiments of the invention for a supercharging device of an internal combustion engine and according to the above description, the supercharging device may, during operation, be switched at least between a booster operating mode and a first recuperation operating mode in a manner dependent on the operating behavior of the internal combustion engine and by the line connections, the valve devices and the motor-generator of the recuperation charger.

Furthermore, it is advantageously additionally possible for a standard operating mode and further different recuperation operating modes to be provided, which may likewise be switched to in a manner dependent on the operating behavior of the internal combustion engine.

The advantage of the abovementioned embodiments of the operating method lies in the fact that, with the described supercharging device, it is possible to react in a highly flexible manner to different operating conditions of the internal combustion engine, in order firstly to achieve maximum or improved operating dynamics and secondly to optimally or better utilize the available energy.

In an advantageous further embodiment of the operating method, a switch is made to the booster operating mode of the supercharging device in the event of a demand for increased rotational speed or in the presence of elevated load of the internal combustion engine. For this purpose, the valve devices and the recuperation charger are in each case set such that the charge-air mass flow is conducted from the high-pressure side of the fresh-air compressor to the low-pressure side of the compressor-turbine and at elevated pressure from the high-pressure side of the compressor-turbine back into the charge-air feed line and thus to the intake side of the internal combustion engine, wherein the motor-generator is switched into a motor mode so as to drive the compressor-turbine for the purposes of increasing the pressure in the charge-air feed line. Thus, high operating dynamics are achieved in particular in the case of step changes in load, that is to say, for example, in acceleration phases of the internal combustion engine.

Now, if the internal combustion engine is running in a load range in which the charge-air mass flow generated by the exhaust-gas turbocharger is sufficient and no additional boosting is required, the recuperation charger may be utilized in a different way, that is to say may be switched into a first recuperation operating mode, which will hereinafter also be referred to merely as "exhaust-gas recuperation operating mode". For this purpose, the valve devices and the recuperation charger are in each case set such that the charge-air mass flow is conducted from the high-pressure side of the fresh-air compressor via the charge-air feed line directly to the intake side of the internal combustion engine, and at the same time, an exhaust-gas mass flow is branched off from the exhaust-gas tract and is conducted to the high-pressure side of the compressor-turbine. The exhaust-gas mass flow is expanded across the compressor-turbine and introduced from the low-pressure side of the compressor-turbine as a blow-off mass flow via a blow-off line into the fresh-air supply device, or blown off via the exhaust-gas tract, wherein the motor-generator is switched into a generator operating mode so as to be driven by the compressor-turbine for the purposes of energy recovery. If the blow-off mass flow is blown off, this is realized by conducting the blow-off mass flow into the exhaust-gas tract again, in order that the applicable environmental legislation is complied with. Introduction into the fresh-air supply device is possible only to an extent such that the branched-off exhaust-gas mass flow corresponds to the exhaust-gas recirculation required in any case for the present operating conditions.

It is thus advantageously possible for exhaust-gas energy that would otherwise have to be released, unutilized, into the surroundings to be recovered and utilized in the vehicle in some other way.

If, in an advantageous embodiment of the operating method, a standard operating mode is provided as a further operating mode and the internal combustion engine is operated, for example, at constant medium load, it is possible for the supercharging device to be switched into the standard operating mode, which will hereinafter also be referred to simply as "standard operating mode". To implement the standard operating mode, the charge-air mass flow is, through corresponding setting of the valve devices, conducted from the high-pressure side of the fresh-air compressor via the charge-air feed line directly to the intake side of the internal combustion engine, wherein the exhaust-gas mass flow is discharged entirely via an exhaust-gas discharge line and is not conducted via the compressor-turbine of the recuperation charger. At the same time, the motor-generator of the recuperation charger is switched into a neutral state, that is to say into a freewheeling state.

The standard operating mode may advantageously be utilized if, for example, shortly after starting of the internal combustion engine, in the presence of a moderate load demand, it is intended for the energy contained in the exhaust gas to be utilized for fast heating of the exhaust gas system, in particular of a catalytic converter or also of a soot particle filter.

In a further advantageous embodiment of the operating method, a further recuperation operating mode is provided, which will hereinafter also be referred to merely as "charge-air recuperation operating mode" and to which a switch may be made during the operation of the internal combustion engine. The charge-air recuperation operating mode is particularly advantageous if a rapid decrease in power of the internal combustion engine is necessary or the charge-air mass flow which is or may be generated by the fresh-air compressor of the exhaust-gas turbocharger is not fully required in low-load operation of the internal combustion engine. To implement the charge-air recuperation operating mode, the charge-air mass flow is conducted from the high-pressure side of the fresh-air compressor at least partially to the high-pressure side of the compressor-turbine, is expanded across the compressor-turbine, and is introduced from the low-pressure side of the compressor-turbine back into the fresh-air supply device via a blow-off line, wherein the motor-generator is switched into a generator operating mode so as to be driven by the compressor-turbine for the purposes of energy recovery. The recirculation of the charge-air mass flow into the fresh-air supply device thus corresponds, in effect, to conventional overrun air recirculation configuration with an interposed compressor-turbine.

Here, the exhaust-gas mass flow is discharged entirely, unutilized, via an exhaust-gas discharge line.

Thus, the fraction not required by the internal combustion engine, or the entire charge-air mass flow, is conducted at high pressure to the compressor-turbine and thus drives the motor-generator, which in turn converts the imparted torque into electrical energy which may be supplied directly to a consumer in the vehicle or to an accumulator. Thus, the excess energy in the supercharging device is not released unutilized to the surroundings, but rather may be supplied for more expedient use, possibly at a later point in time. At the same time, the undesired operating state of compressor surging of the exhaust-gas turbocharger is reliably avoided.

In a further advantageous embodiment of the operating method, a further recuperation operating mode is provided, which will hereinafter also be referred to as mixed "exhaust-gas/charge-air recuperation operating mode", and to which a switch may be made during the operation of the internal combustion engine. The exhaust-gas/charge-air recuperation operating mode is advantageous in particular in situations when, proceeding from the purely exhaust-gas recuperation operating mode, a rapid reduction in power is demanded, and thus a considerable excess charge-air mass flow is present and there is the risk of the exhaust-gas turbocharger entering the operating state of compressor surging. To implement the exhaust-gas/charge-air recuperation operating mode, the charge-air mass flow is conducted from the high-pressure side of the fresh-air compressor at least partially to the high-pressure side of the compressor-turbine, and at the same time, at least a part of the exhaust-gas mass flow is branched off from the exhaust-gas tract and conducted to the high-pressure side of the compressor-turbine. In this way, a mixed mass flow of exhaust gas and charge air forms which is expanded across the compressor-turbine and which is blown off from the low-pressure side of the compressor-turbine via a blow-off line (into the exhaust-gas tract of the internal combustion engine) or introduced into the fresh-air supply device. Here, the motor-generator is switched into a generator operating mode so as to be driven by the compressor-turbine for the purposes of energy recovery.

The advantages of the supercharging device of the corresponding operating method lie in particular in the fact that, depending on the operating situation of the internal combustion engine in the booster operating mode or in one of the recuperation operating modes, it is firstly the case that a fast increase of torque and thus rotational speed are made possible while avoiding "turbo lag", and secondly, in the opposite case of an excess of power or a fast decrease in power, excess energy of the exhaust-gas mass flow or of the charge-air mass flow does not have to be dissipated unutilized, but rather may be made utilizable.

Below, particularly advantageous embodiments and refinements of the invention will be discussed in more detail on the basis of the figures which take the form of simplified schematic illustrations, even though the subject matter of the invention is not restricted to these examples and in particular to the combinations of features presented therein.

BRIEF DESCRIPTION

DETAILED DESCRIPTION

Items of identical function and designation are denoted by the same reference designations throughout the figures.

Figure 1:
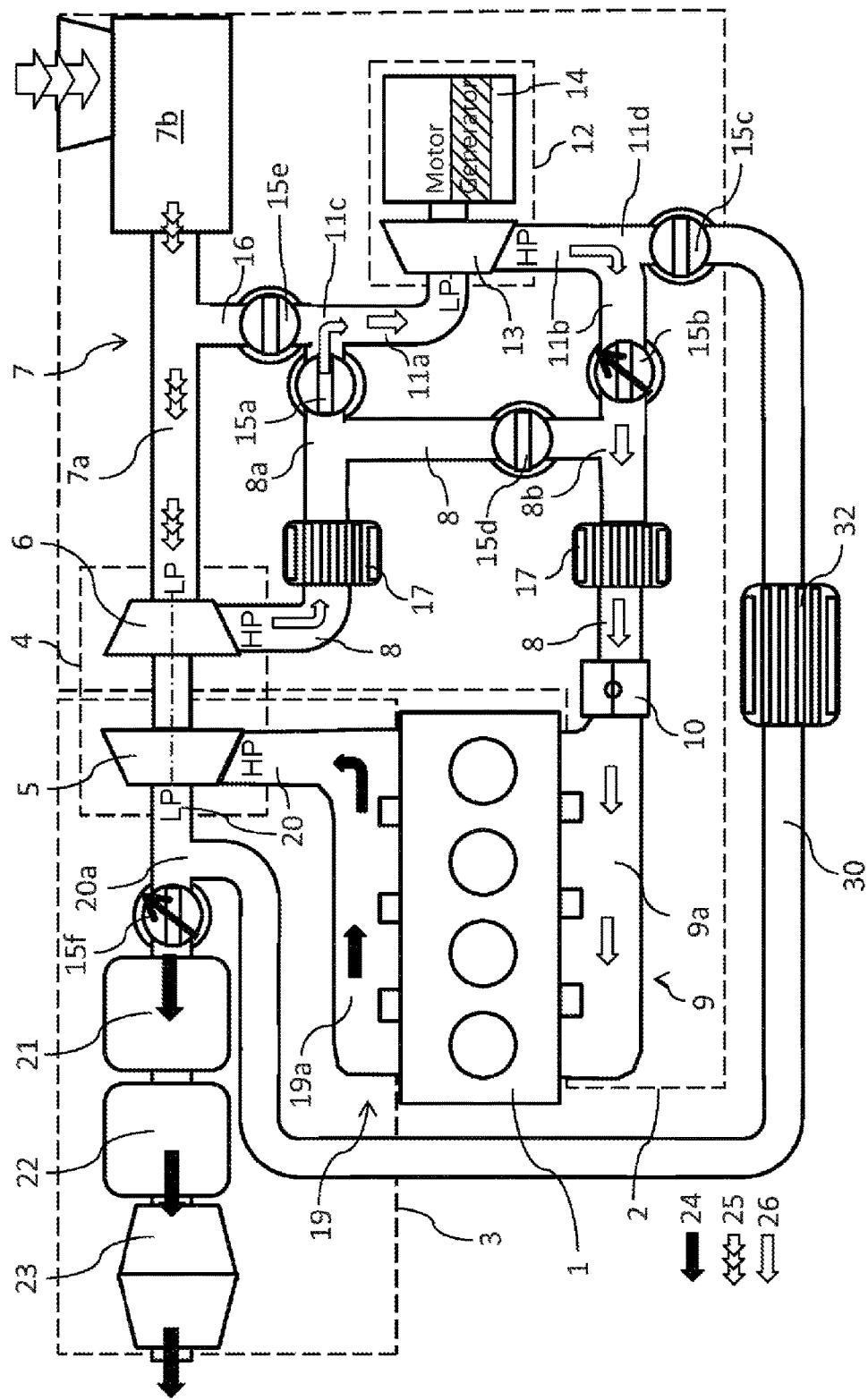
FIG. 1 shows a first example embodiment of the supercharging device in conjunction with an internal combustion engine in the booster operating mode.

The example embodiment of the invention in FIG. 1 shows, in a schematically simplified illustration, an internal combustion engine 1, illustrated in this case schematically as a four-cylinder in-line reciprocating-piston engine, having an intake tract 2 arranged on the intake side 9 and having an exhaust-gas tract 3 arranged on the exhaust-gas side 19. Also illustrated is an exhaust-gas turbocharger 4 with an exhaust-gas turbine 5 in the exhaust-gas tract 3 and a fresh-air compressor 6 in the intake tract 2 and a so-called recuperation charger 12, which has a compressor-turbine 13 and an electromechanical motor-generator 14.

The exhaust-gas tract 3 includes an exhaust-gas manifold 19a, which is connected on the exhaust-gas side 19 to the internal combustion engine 1, the exhaust-gas turbine 5, which is connected on its high-pressure side HP to the exhaust-gas manifold 19a by the exhaust-gas discharge line 20 and which continues to the low-pressure side LP of the exhaust-gas turbine 5, and an exhaust-gas catalytic converter 21, a soot particle filter 22 and a silencer 23, which are arranged along the exhaust-gas discharge line 20. The exhaust-gas mass flow 24 (illustrated by darkened arrows) discharged from the internal combustion engine 1 is discharged from the exhaust-gas manifold 19a and from the exhaust-gas discharge line 20 via the exhaust-gas turbine 5 and through exhaust-gas catalytic converter 21, soot particle filter 22 and silencer 23 into the surroundings.

The intake tract 2 includes a charge-air manifold 9a, which is connected on the intake side 9 to the internal combustion engine 1, the fresh-air compressor 6 of the exhaust-gas turbocharger 4, and a charge-air feed line 8, which is connected at one side via a throttle flap valve 10 to the charge-air manifold 9a and which is connected at the other side to the high-pressure side HP of the fresh-air compressor 6. Furthermore, the intake tract 2 includes a fresh-air supply device 7 with a fresh-air supply line 7a and a fresh-air filter device 7b; the fresh-air supply line 7a is connected at one side to the low-pressure side LP of the fresh-air compressor 6 and at the other side to the fresh-air filter device 7b. Likewise assigned to the intake tract 2 is a recuperation charger 12 which has a compressor-turbine 13 and, coupled thereto, a motor-generator 14. The low-pressure side LP of the compressor-turbine 13 is connected via a low-pressure branch line 11a to the charge-air feed line 8 at a first charge-air branching point 8a. Furthermore, a blow-off line 16 is connected to the low-pressure branch line 11a at a low-pressure branching point 11c between the low-pressure side LP of the compressor-turbine 13 and the first charge-air branching point 8a.

To the high-pressure side HP of the compressor-turbine 13 there is connected a high-pressure branch line 11b, which is in turn connected to the charge-air feed line 8 at a second charge-air branching point 8b downstream of the first charge-air branching point 8a in the charge-air mass flow 26.

Furthermore, an exhaust-gas recirculation line 30 is connected to the high-pressure branch line 11b at a high-pressure branching point 11d between the high-pressure side HP of the compressor-turbine 13 and the second charge-air branching point 8b, which exhaust-gas recirculation line is in turn connected by means of its other end to the exhaust-gas discharge line 20 at an exhaust-gas branching point 20a between the low-pressure side LP of the exhaust-gas turbine 5 and the exhaust-gas catalytic converter 21.

In each case, one charge-air cooler 17 is arranged in the charge-air feed line 8 upstream of the first charge-air branching point 8a and downstream of the second charge-air branching point 8b in the charge-air mass flow 26. Furthermore, an exhaust-gas cooler 32 is arranged in the exhaust-gas recirculation line 30.

Furthermore, multiple valve devices 15a-15f for controlling the charge-air mass flow 26 and the exhaust-gas mass flow 24 are arranged in the abovementioned line connections 8, 11a, 11b, 20 and 30.

A first valve device 15a is arranged in the low-pressure branch line 11a between the first charge-air branching point 8a and the low-pressure branching point 11c, and a second valve device 15b is arranged in the high-pressure branch line 11b between the high-pressure branching point 11d and the second charge-air branching point 8b. A third valve device 15c is arranged in the exhaust-gas recirculation line 30. In the charge-air feed line 8, a further valve device 15d is arranged between the first and the second charge-air branching points 8a, 8b, and a further valve device 15e is arranged between the low-pressure branching point 11c and the blow-off line 16. A further valve device 15f, herein also referred to as exhaust-gas branch valve 15f, is arranged in the exhaust-gas discharge line 20, downstream of the exhaust-gas branching point 20a in the exhaust-gas mass flow 24.

Valve devices 15a-15f may in principle all be in the form of simple shut-off valves which may assume the two states of "shut off" and "open". With a valve embodiment and valve arrangement of this type, it is possible to switch between the operating modes booster operating mode, exhaust-gas recuperation operating mode, standard operating mode, charge-air recuperation operating mode and exhaust-gas charge-air recuperation operating mode. A transition operating mode, in the case of which only a part of the exhaust-gas mass flow 24 or charge-air mass flow 26 is conducted via the compressor-turbine 13 for energy recuperation purposes, is thus not possible. However, if the second valve device 15b is a proportional valve 15b, as is schematically illustrated in FIG. 1 by a diagonal arrow, it is possible, proceeding from the shut-off valve position in the purely standard operating mode, for a variable fraction of the charge-air mass flow 26 to be conducted to the compressor-turbine through regulated partial opening in any desired valve intermediate position. The same applies to the exhaust-gas branch valve 15f in the exhaust-gas discharge line 20, by which a variable fraction of the exhaust-gas mass flow 24 may be conducted via the exhaust-gas recirculation line 30 to the compressor-turbine through regulated partial closing in any desired valve intermediate position.

The embodiment of the supercharging device as per FIG. 1 has the advantage here that use may be made of valve devices which are particularly simple from mechanical and control aspects, and which make it possible to realize a robust and inexpensive construction.

FIG. 1 illustrates the example embodiment of the supercharging device with a valve position as per the booster operating mode, which is set when demanded by a rapid increase in load or if a rapid increase in rotational speed of the internal combustion engine is demanded.

Here, the first and the second valve device 15a, 15b and thus the passage of the low-pressure branch line 11a and of the high-pressure branch line 11b are fully open, wherein at the same time, the third valve device 15c in the exhaust-gas recirculation line 30 and the further valve devices 15d and 15e in the charge-air feed line 8 and in the blow-off line 16 are closed.

At the same time, the exhaust-gas branch valve 15f in the exhaust-gas discharge line 20 is fully open.

In the booster operating mode illustrated in FIG. 1, therefore, the passage from the first charge-air branching point 8a to the low-pressure side LP of the compressor-turbine 13 is open, and the passage to the blow-off line 16 is shut off. At the same time, the passage from the high-pressure branch line 11b to the charge-air feed line 8 is open, and the passage of the charge-air feed line 8 between the first and second charge-air branching points 8a, 8b and the passage of the exhaust-gas recirculation line 30 are shut off. At the same time, the motor-generator 14 has been switched to the motor operating mode (only the "generator" label has been struck through).

Thus, in the booster operating mode, a fresh-air mass flow 25, illustrated in FIG. 1 by triple arrows, is drawn in via the fresh-air filter device 7b and the fresh-air supply line 7a. In the fresh-air compressor 6 of the exhaust-gas turbocharger 4, the fresh-air mass flow 25 is compressed and is, on the high-pressure side HP of the fresh-air compressor 6, pumped at elevated pressure into the charge-air feed line 8. The air mass flow discharged on the high-pressure side HP of the fresh-air compressor 6 is then referred to in this context as charge-air mass flow 26, which is intended to indicate the elevated pressure level.

The charge-air mass flow 26 is conducted from the high-pressure side HP of the fresh-air compressor 6 to the low-pressure side LP of the compressor-turbine 13, is compressed further by the compressor-turbine, and is conducted from the high-pressure side HP of the compressor-turbine 13 back into the charge-air feed line 8 and to the intake side 9 of the internal combustion engine 1. The motor-generator 14, in the motor operating mode, drives the compressor-turbine 13 for the purposes of increasing pressure in the charge-air feed line 8.

Figure 2:
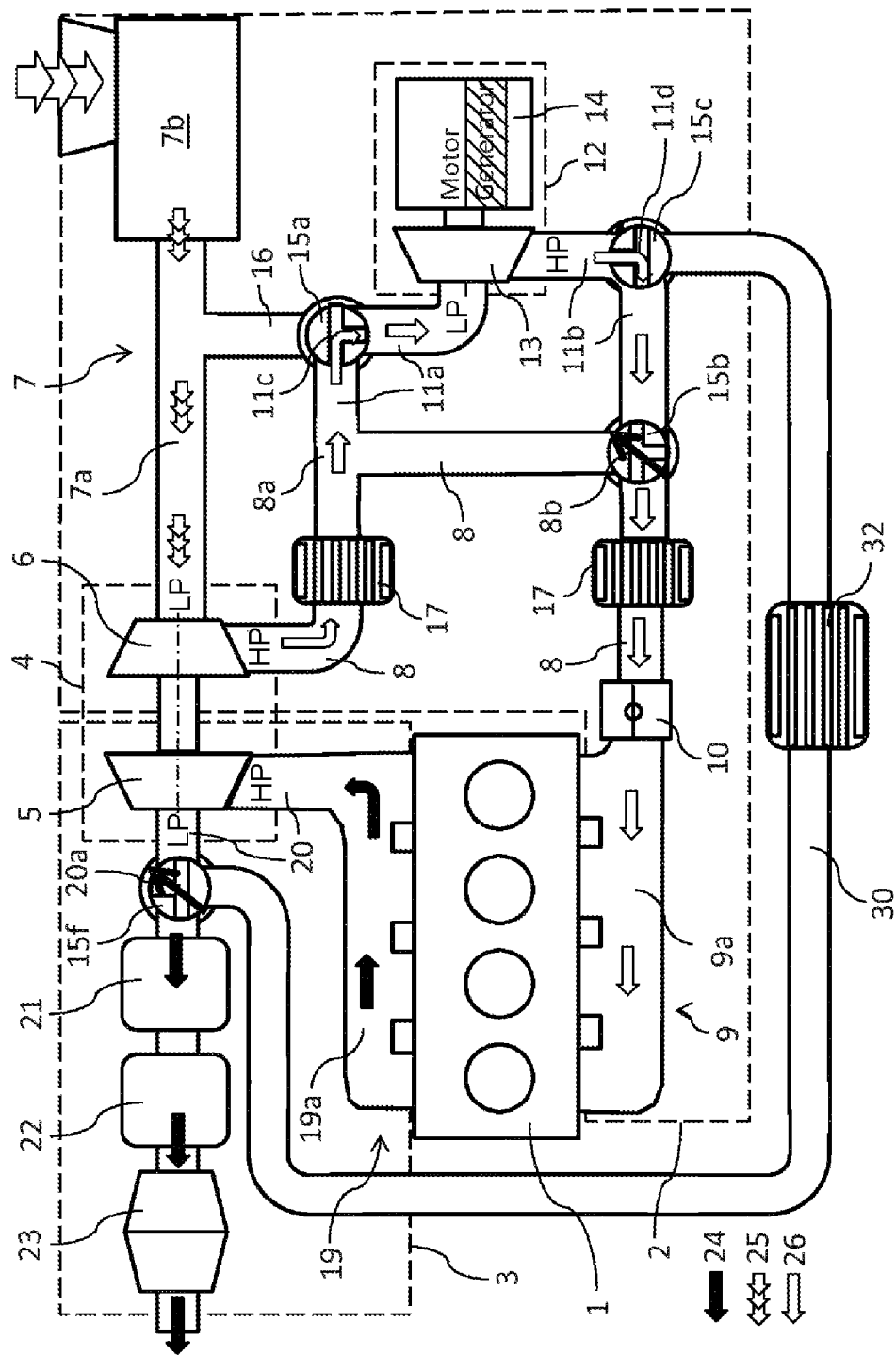
FIG. 2 shows an example embodiment of the supercharging device with different valve devices in relation to FIG. 1 in the booster operating mode.

The embodiment of the supercharging device shown in FIG. 2 differs from the embodiment in FIG. 1 merely by the embodiment and arrangement of the valve devices, and is distinguished by the fact that the first valve device 15a, the second valve device 15b, the third valve device 15c and the exhaust-gas branch valve 15f in the exhaust-gas discharge line 20 are each designed as switching valves, whereby the further valve devices 15d and 15e may be omitted. Furthermore, the second valve device 15b and the exhaust-gas branch valve 15f are designed as proportional valves 15b, 15f (indicated by diagonal arrows), whereby partial switching, and thus the distribution of the exhaust-gas mass flow 24 and of the charge-air mass flow 26, are also made possible. The use of proportional valves is, however, not imperatively necessary if complete switching between the operating modes is sufficient in each case.

Figure 3:
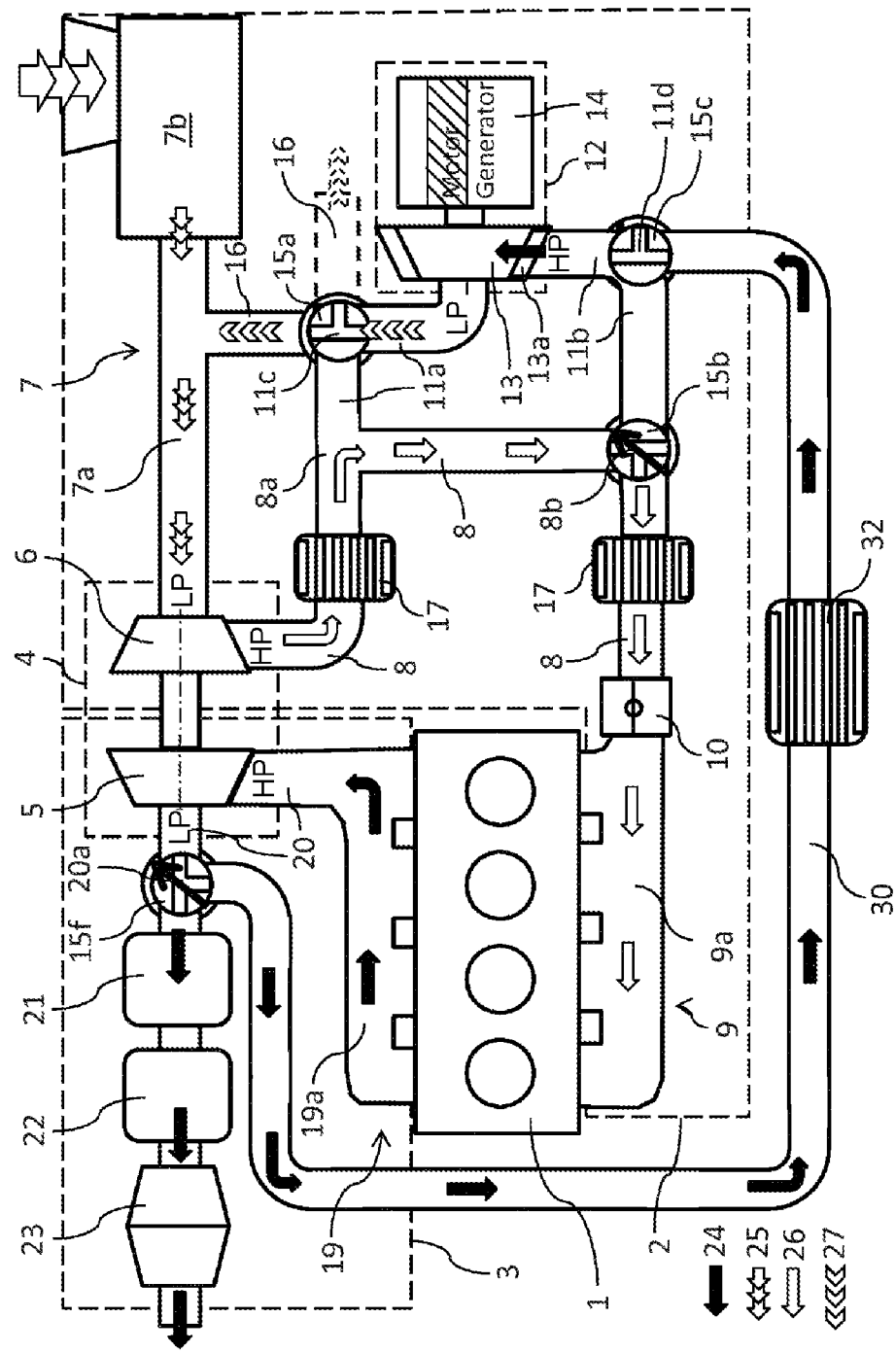
FIG. 3 shows the example embodiment of the supercharging device substantially as per FIG. 2, but in the exhaust-gas recuperation operating mode.

Here, the first valve device 15a is arranged at the low-pressure branching point 11c, wherein, in a valve position illustrated in FIG. 2, with an open passage from the first charge-air branching point 8a to the low-pressure side LP of the compressor-turbine 13, the passage to the blow-off line 16 is shut off, and in a further valve position (not illustrated in FIG. 2) with a shut-off passage from the first charge-air branching point 8a to the low-pressure side LP of the compressor-turbine 13, the passage from the low-pressure side LP of the compressor-turbine 13 to the blow-off line 16 is open (see FIG. 3).

Figure 5:
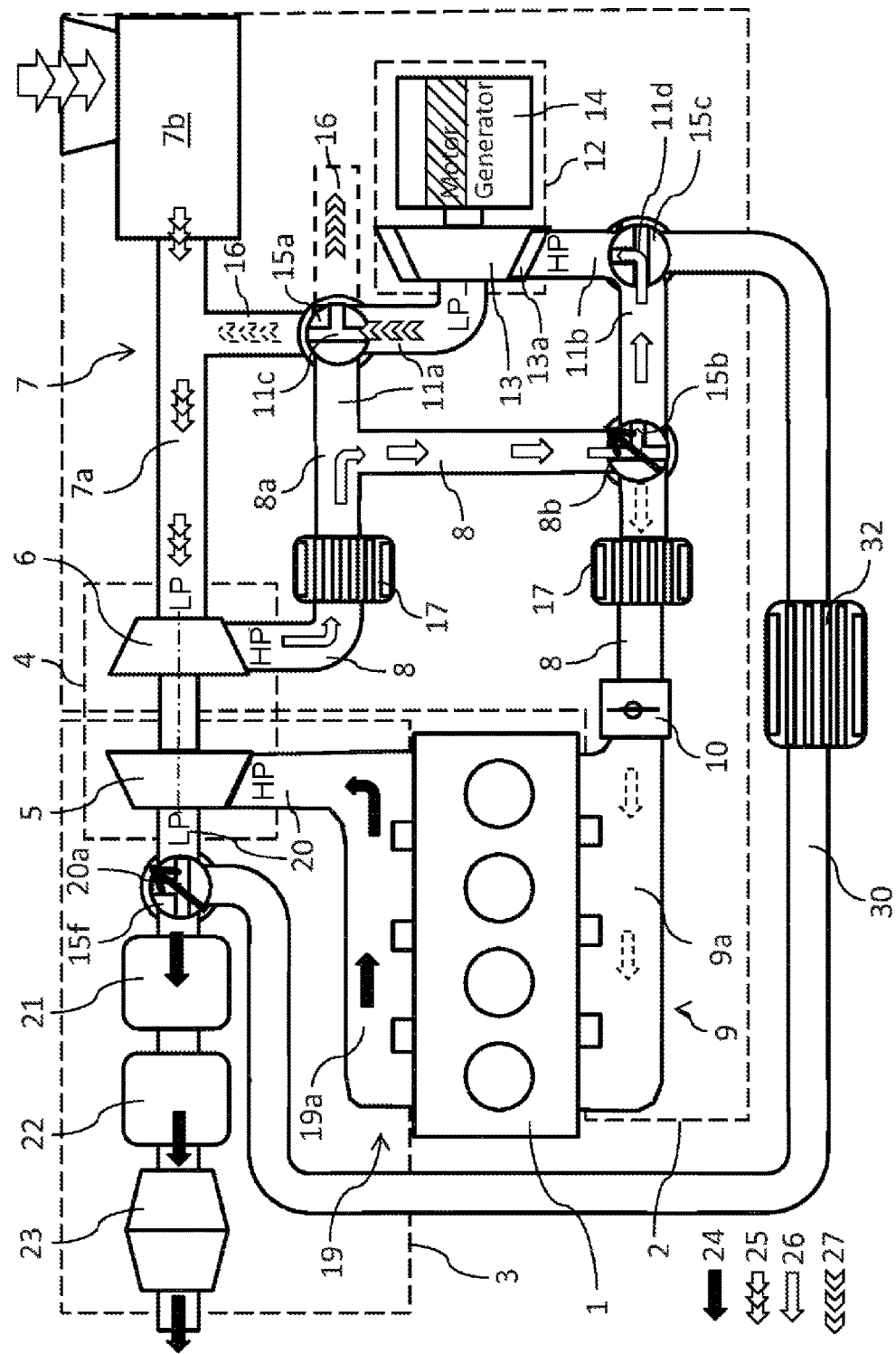
FIG. 5 shows the example embodiment of the supercharging device as per FIG. 3, but in the charge-air recuperation operating mode.

The second valve device 15b is arranged at the second charge-air branching point 8b, wherein, in a valve position with a shut-off passage of the charge-air feed line 8 to the intake side 9 of the internal combustion engine 1 and to the high-pressure branch line 11b, the passage from the high-pressure branch line 11b to the intake side 9 of the internal combustion engine 1 is open (as illustrated in FIG. 2), and in a further valve position with an open passage of the charge-air feed line 8 to the intake side 9 of the internal combustion engine 1, the passage from the charge-air feed line 8 to the high-pressure branch line 11b is shut off (as shown in FIG. 3), and in a further valve position with an open passage of the charge-air feed line 8 from the high-pressure side HP of the fresh-air compressor 6 to the high-pressure branch line 11b, the passage of the charge-air feed line 8 to the intake side 9 of the internal combustion engine 1 is shut off (as shown in FIG. 5). If the second valve device 15b is in the form of a proportional valve 15b, as indicated in FIG. 2 by a diagonal arrow, it is also possible for intermediate positions of the valve to be set in which, with a partially open passage of the charge-air feed line 8 to the high-pressure branch line 11b, the passage of the charge-air feed line 8 to the intake side 9 of the internal combustion engine 1 is partially shut off to the same extent, in order that the charge-air mass flow 26 is distributed between the intake side 9 of the internal combustion engine 1 and the compressor-turbine 13.

Figure 4:
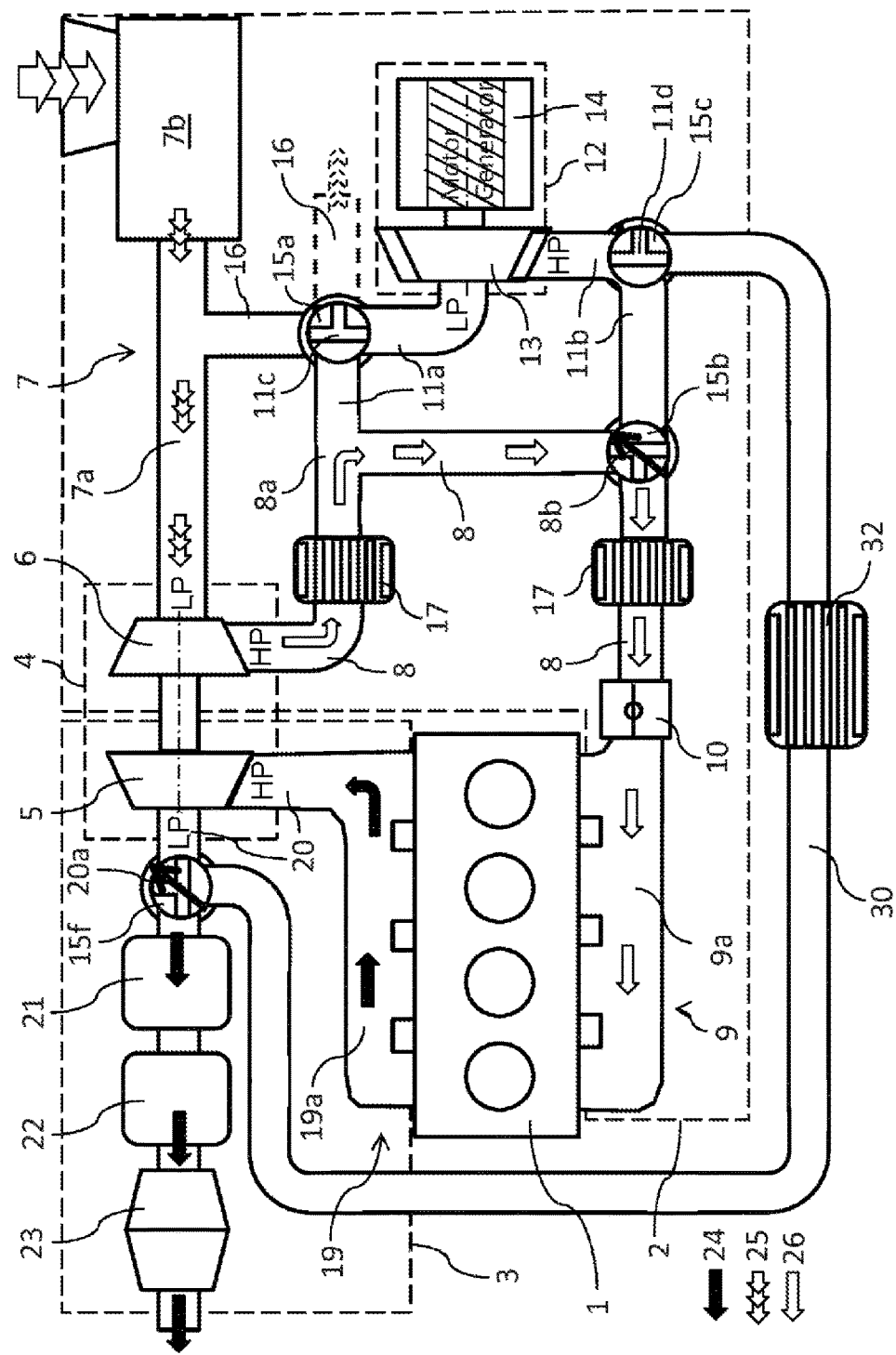
FIG. 4 shows the example embodiment of the supercharging device as per FIG. 3, but in the standard operating mode.
Figure 6:
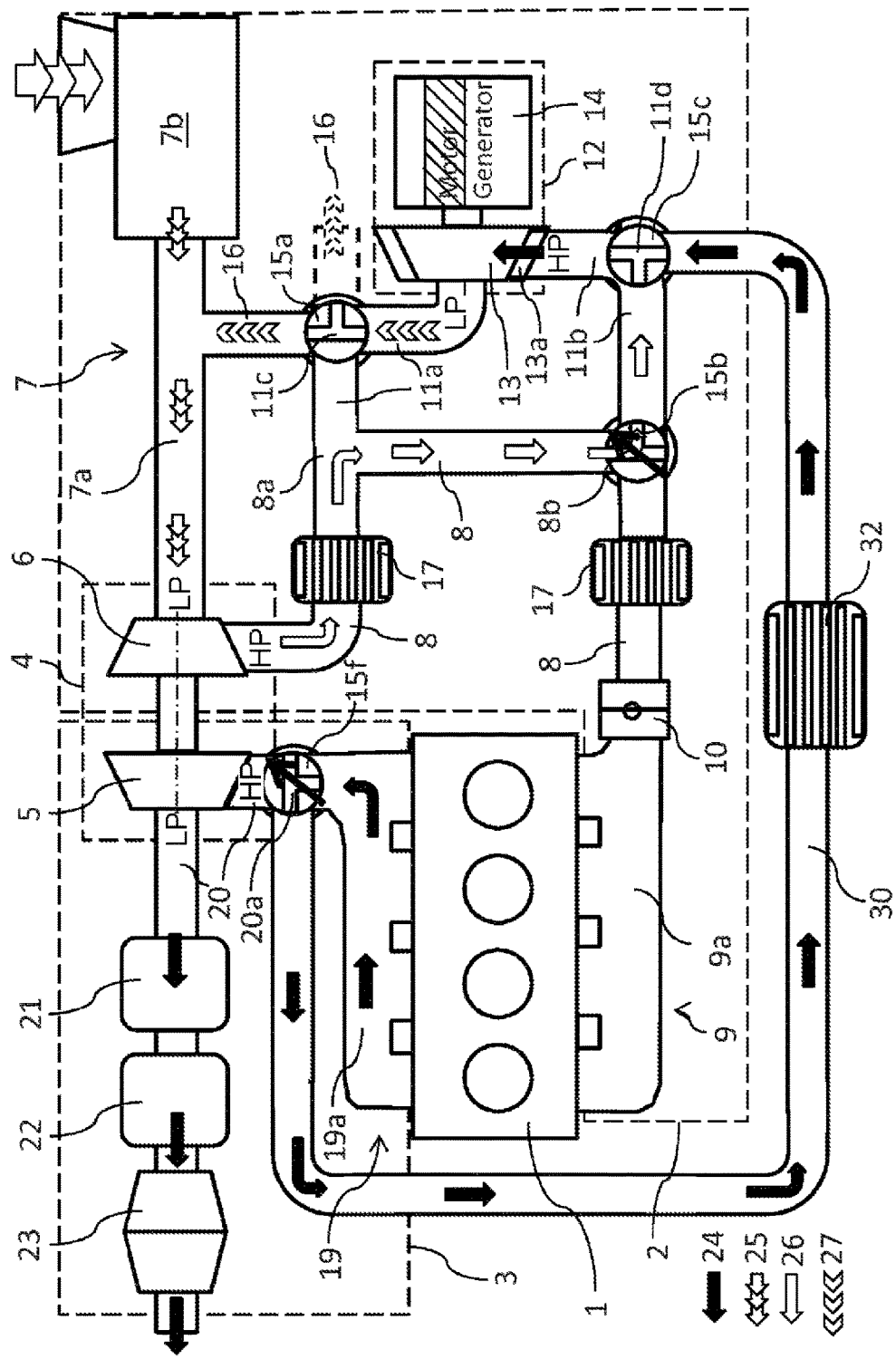
FIG. 6 shows the example embodiment of the supercharging device as per FIG. 3, but in the exhaust-gas/charge-air recuperation operating mode.

The third valve device 15c is arranged at the high-pressure branching point 11d of the high-pressure branch line 11b, wherein, in a valve position with a shut-off passage from the exhaust-gas recirculation line 30 to the high-pressure branch line 11b, the passage from the high-pressure side HP of the compressor-turbine 13 to the second charge-air branching point 8b is open (as illustrated in FIG. 2 and FIG. 5). In a further valve position, with an open passage from the exhaust-gas recirculation line 30 to the high-pressure side HP of the compressor-turbine 13, the passage from the exhaust-gas recirculation line 30 to the second charge-air branching point 8b is shut off (as illustrated in FIGS. 3 and 4). Finally, in a further valve position, both the passage from the exhaust-gas recirculation line 30 and the passage from the second charge-air branching point 8b to the high-pressure side HP of the compressor-turbine 13 are open (as illustrated in FIG. 6).

The exhaust-gas branch valve 15f is arranged at the exhaust-gas branching point 20a of the exhaust-gas discharge line 20 and is in the form of a proportional valve 15f as indicated in FIG. 2 by a diagonal arrow, wherein, in FIG. 2, in the case of a shut-off passage from the exhaust-gas discharge line 20 to the exhaust-gas recirculation line 30, the passage of the exhaust-gas discharge line 20 downstream of the exhaust-gas branching point 20a is fully open.

The embodiment as a proportional valve however also permits intermediate positions of the exhaust-gas branch valve 15f, wherein, in the case of an at least partially open passage from the exhaust-gas discharge line 20 to the exhaust-gas recirculation line 30, the passage of the exhaust-gas discharge line 20 downstream of the exhaust-gas branching point 20a is at least partially shut off in order to branch off a part of the exhaust-gas mass flow 24 into the exhaust-gas recirculation line 30.

Here, the embodiment of the supercharging device as per FIG. 2 has the advantage that the number of mechanical components required, and thus also the structural space required for the supercharging device, are reduced.

FIG. 3 shows the construction and arrangement of the supercharging device as in FIG. 2. Here, however, by contrast to FIG. 2, the compressor-turbine 13 is, in a symbolically indicated manner, equipped with a fixed or variable turbine geometry 13a, that is to say with a fixed or variable, that is to say movable, guide blade arrangement 13a in the housing of the compressor-turbine 13. This has the advantage, in particular in the case of a movable guide blade arrangement 13a, that the inflow, in particular the inflow angle, at the compressor-turbine 13, or the outflow of the blow-off mass flow, may in each case be optimized in a manner dependent on the operating mode of the recuperation charger, motor operating mode or generator operating mode, and thus on the inflow direction of the charge-air mass flow or exhaust-gas mass flow.

Furthermore, in FIG. 3, a free line end at the low-pressure branching point 11c is additionally indicated by means of a dashed line. This constitutes an alternative blow-off line 16, which allows the blow-off mass flow 27 to be blown off into the surroundings rather than being fed into the fresh-air supply device. This is however expediently realized by means of a connection to the exhaust-gas tract 3 upstream, as viewed in the flow direction, of the components for exhaust-gas aftertreatment, such as the exhaust-gas catalytic converter 21 and the soot particle filter 22. It is thus ensured that the exhaust gas that is branched off for recuperation purposes is not blown off into the surroundings without being treated, and the legal requirements for the exhaust-gas values may be complied with. For the sake of clarity, the recirculation of the blow-off mass flow 27 into the exhaust-gas tract 3 is not illustrated in the figures.

FIG. 3 furthermore shows a setting of the valve devices 15a, 15b, 15c and 15f which corresponds to a first recuperation operating mode, hereinafter also referred to, for better distinction, as "exhaust-gas recuperation operating mode". To implement the exhaust-gas recuperation operating mode, the first switching valve 15a at the low-pressure branching point 11c is set such that, in the case of a shut-off passage from the first charge-air branching point 8a to the low-pressure side LP of the compressor-turbine 13, the passage from the low-pressure side LP of the compressor-turbine 13 to the blow-off line 16 is open, wherein the second switching valve 15b at the second charge-air branching point 8b is set such that, in the case of an open passage of the charge-air feed line 8 to the intake side 9 of the internal combustion engine 1, the passage from the charge-air feed line 8 to the high-pressure branch line 11b is shut off. Furthermore, the third switching valve 15c is set such that, in the case of a shut-off passage of the high-pressure branch line 11b to the charge-air feed line 8, the passage from the exhaust-gas recirculation line 30 to the high-pressure branch line 11b is open. Finally, the exhaust-gas branch valve 15f is set such that, in the case of an at least partially open passage from the exhaust-gas discharge line 20 to the exhaust-gas recirculation line 30, the passage of the exhaust-gas discharge line 20 downstream of the exhaust-gas branching point 20a is at least partially shut off.

In this way, to implement the exhaust-gas recuperation operating mode, the charge-air mass flow 26 is conducted from the high-pressure side HP of the fresh-air compressor 6 via the charge-air feed line 8 directly to the intake side 9 of the internal combustion engine, and at the same time, at least a part of the exhaust-gas mass flow 24 is branched off from the exhaust-gas tract 3 and is conducted to the high-pressure side HP of the compressor-turbine 13 and is expanded across the compressor-turbine. Subsequently, the blow-off mass flow 24 is, as blow-off mass flow 27, blown off from the low-pressure side LP of the compressor-turbine 13 via a blow-off line 16 into the exhaust-gas tract 3 or conducted into the fresh-air supply device 7. Here, the motor-generator 14 is switched into a generator operating mode in which it is driven by the compressor-turbine 13 for the purposes of energy recovery, and generates electrical energy which may be fed into a corresponding accumulator, such as for example a battery or an accumulator capacitor (neither of which is illustrated), of a vehicle driven by the internal combustion engine, where available for use for various purposes in the vehicle.

FIG. 4 in turn illustrates the same arrangement of the supercharging device as per FIG. 3, wherein the difference is that the valve devices 15a, 15b, 15c and 15f are shown in a setting which corresponds to the so-called standard operating mode. The setting of the first switching valve 15a, of the second switching valve 15b and of the third switching valve 15c corresponds here in each case to the setting in the exhaust-gas recuperation operating mode (see FIG. 3 and the associated description), with only the exhaust-gas branch valve 15f being set such that the passage from the exhaust-gas discharge line 20 to the exhaust-gas recirculation line 30 is shut off.

In the standard operating mode, therefore, a fresh-air mass flow 25, illustrated in FIG. 4 by triple arrows, is drawn in via the fresh-air filter device 7b and the fresh-air supply line 7a. In the fresh-air compressor 6 of the exhaust-gas turbocharger 4, the fresh-air mass flow 25 is compressed and, on the high-pressure side HP of the fresh-air compressor 6, the fresh-air mass flow 25 is pumped at elevated pressure into the charge-air feed line 8 and via the at least partially open throttle flap valve 10 and the charge-air manifold 9a into the cylinders of the internal combustion engine 1. The air mass flow that is discharged on the high-pressure side HP of the fresh-air compressor 6 is then referred to in this context as charge-air mass flow 26, which is intended to indicate the elevated pressure level. The exhaust-gas mass flow 24 is entirely discharged, unutilized, via the exhaust-gas discharge line 20, and the motor-generator 14 of the recuperation charger 12 is switched into a neutral state, which is indicated in FIG. 4 by the fact that both the "motor" label and the "generator" label have been struck through.

Proceeding from the standard operating mode, a switch may be easily made to the exhaust-gas recuperation operating mode in that, by the exhaust-gas branch valve 15f, the passage to the exhaust-gas recirculation line 30 is at least partially open, and at the same time the passage of the exhaust-gas discharge line 20 downstream of the exhaust-gas branching point 20a is at least partially shut off.

FIG. 5 in turn shows the same arrangement of the supercharging device as FIG. 3. The setting of the switching valves 15a, 15b, 15c and 15f however corresponds to a further recuperation operating mode, which may also be referred to as purely "charge-air recuperation operating mode".

Here, the first switching valve 15a at the low-pressure branching point 11c of the low-pressure branch line 11a is set such that, in the case of a shut-off passage from the first charge-air branching point 8a to the low-pressure side LP of the compressor-turbine 13, the passage from the low-pressure side LP of the compressor-turbine 13 to the blow-off line 16 is open. At the same time, the second switching valve 15b at the second charge-air branching point 8b is set such that, in the case of an at least partially or fully open passage of the charge-air feed line 8 to the high-pressure branch line 11b, the passage of the charge-air feed line 8 to the intake side 9 of the internal combustion engine 1 is at least partially or fully shut off. Here, the exhaust-gas branch valve 15f remains in the same setting as in the standard operating mode, with the passage from the exhaust-gas discharge line 20 to the exhaust-gas recirculation line 30 remaining shut-off, and the motor-generator 14 of the recuperation charger 12 being switched into the generator operating mode.

In accordance with the described valve settings, it is thus the case that, to implement the charge-air recuperation operating mode illustrated in FIG. 5, the charge-air mass flow 26 is conducted from the high-pressure side HP of the fresh-air compressor 6 at least partially to the high-pressure side HP of the compressor-turbine 13, is expanded across the compressor-turbine 13, and is conducted from the low-pressure side LP of the compressor-turbine 13 via a blow-off line 16 preferably into the fresh-air supply device 7. Here, the motor-generator 14 is switched into a generator operating mode, so as to be driven by the compressor-turbine 13 for the purposes of energy recovery (the "motor" label has been struck through). Here, the exhaust-gas mass flow 24 is not utilized by the recuperation charger 12 and is discharged entirely via an exhaust-gas discharge line 20.

In the case of a proportional valve 15b being used, the opening may be performed in progressively or else only partially regulated fashion in order to branch off exactly that fraction of the charge-air mass flow 26 which is not presently required by the internal combustion engine.

Through corresponding valve setting of the valve devices 15a, 15b and 15c, therefore, the flow direction of the charge-air mass flow 26 across the compressor-turbine 13 may be switched.

Finally, FIG. 6 illustrates, substantially on the basis of the same arrangement of the supercharging device as in FIGS. 3 to 5, a setting of the valve devices 15a, 15b, 15c and 15f which corresponds to a further recuperation operating mode, which may also be referred to as mixed "charge-air/exhaust-gas recuperation operating mode". Here, the first switching valve 15a is set such that, in a valve setting with a shut-off passage from the first charge-air branching point 8a to the low-pressure side LP of the compressor-turbine 13, the passage from the low-pressure side LP of the compressor-turbine 13 to the blow-off line 16 is open. By contrast, the second switching valve 15b is set as in the charge-air recuperation operating mode (see FIG. 5), wherein, in the case of an at least partially or fully open passage of the charge-air feed line 8 to the high-pressure branch line 11b, the passage of the charge-air feed line 8 to the intake side 9 of the internal combustion engine 1 is at least partially or fully shut off. The third switching valve 15c is in this case is set such that both the passage from the high-pressure branch line 11b to the charge-air feed line 8 and the passage from the exhaust-gas recirculation line 30 to the high-pressure branch line 11b are open. At the same time, the exhaust-gas branch valve 15f is set such that, in the case of an at least partially open passage from the exhaust-gas discharge line 20 to the exhaust-gas recirculation line 30, the passage of the exhaust-gas discharge line 20 downstream of the exhaust-gas branching point 20a is at least partially shut off. By contrast to the illustration of FIGS. 1 to 5, the exhaust-gas recirculation line 30 is connected in an exhaust-gas branching point 20a of the exhaust-gas discharge line 20, which exhaust-gas branching point lies on the high-pressure side HP of the exhaust-gas turbine 5 of the exhaust-gas turbocharger 4. It is thus possible for the exhaust-gas branch valve 15f to be operated, as it were, in the manner of a conventional wastegate valve, wherein here, the exhaust-gas mass flow is not simply conducted past the exhaust-gas turbine 5 and back into the exhaust-gas discharge line 20, but is rather conducted, for recuperation purposes, across the compressor-turbine 13 of the recuperation charger 12. This is advantageous in particular in the charge-air/exhaust-gas recuperation operating mode, because the recirculated exhaust gas is at a relatively high pressure level and may thus be more easily merged with the charge-air mass flow, which is likewise at an elevated pressure level.

Thus, to implement the charge-air/exhaust-gas recuperation operating mode, the charge-air mass flow 26 is conducted from the high-pressure side HP of the fresh-air compressor 6 at least partially to the high-pressure side HP of the compressor-turbine 13, and at the same time, at least a part of the exhaust-gas mass flow 24 is branched off upstream of the exhaust-gas turbine 5 in the exhaust-gas tract 3 and likewise conducted to the high-pressure side HP of the compressor-turbine 13, whereby a mixed mass flow of exhaust gas and charge air forms which is expanded across the compressor-turbine and which may be blown off from the low-pressure side LP of the compressor-turbine 13 via a blow-off line 16 via the exhaust-gas tract or conducted into the fresh-air supply device 7. Here, the motor-generator 14 of the recuperation charger 12 is switched into the generator operating mode so as to be driven by the compressor-turbine 13 for the purposes of energy recovery.

The supercharging devices illustrated in FIGS. 1 to 6 have, as already mentioned, two charge-air coolers 17 arranged at two different positions in the charge-air feed line 8 in the charge-air mass flow 26. One charge-air cooler 17 is arranged between the high-pressure side HP of the fresh-air compressor 6 and the first charge-air branching point 8a, and the second charge-air cooler 17 is arranged between the second charge-air branching point 8b and the throttle flap valve 10. This advantageously yields two-stage charge-air cooling for the standard operating mode and the booster operating mode, and in the charge-air recuperation operating mode, a cooled charge-air mass flow 26 is conducted to the compressor-turbine 13.

Furthermore, by use of the exhaust-gas cooler 32 arranged in the exhaust-gas recirculation line 30, the exhaust-gas mass flow 24 that is branched off for recuperation purposes is also cooled before being conducted across the compressor-turbine 13 in the exhaust-gas recuperation operating mode or in the charge-air/exhaust-gas recuperation operating mode. An expensive design of the compressor-turbine 13 for elevated operating temperatures is thus not necessary.

Summarized briefly once again, the invention thus relates to a supercharging device and to an operating method for the supercharging device for an internal combustion engine. Here, the supercharging device has an exhaust-gas turbocharger and a recuperation charger, wherein the recuperation charger has a compressor-turbine and an electromechanical motor-generator coupled thereto. Here, by use of line connections and valve devices, the compressor-turbine is connectable, on its low-pressure side downstream of the fresh-air compressor of the exhaust-gas turbocharger, to the charge-air feed line, and on its high-pressure side, both to the charge-air feed line and to the exhaust-gas tract. The recuperation charger 12 may, by the valve devices and the motor-generator, be switched at least between a booster operating mode and a recuperation operating mode, wherein the recuperation charger is operable firstly in the booster operating mode, in a manner driven by the motor-generator, as a compressor for increasing pressure in the charge-air supply line, or secondly, in a manner driven by at least in each case a part of the charge-air mass flow and/or of the exhaust-gas mass flow, as a turbine for energy recovery by means of the motor-generator.

The foregoing embodiments have been shown and described for the purposes of illustrating the structural and functional principles of the present invention, as well as illustrating the methods of employing the embodiments and are subject to change without departing from such principles. Therefore, this invention includes all modifications encompassed within the scope of the following claims.

We claim:

1. A supercharging device for an internal combustion engine having an intake side, an exhaust-gas side, an intake tract arranged on the intake side and an exhaust-gas tract arranged on the exhaust-gas side, the supercharging device comprising:
    an exhaust-gas turbocharger having an exhaust-gas turbine, which is arranged in the exhaust-gas tract, and a fresh-air compressor having a low-pressure side and a high-pressure side, which is arranged in the intake tract,
    a fresh-air supply device to which the fresh-air compressor is connected on the low-pressure side thereof,
    a charge-air feed line which connects the high-pressure side of the fresh-air compressor to the intake side of the internal combustion engine for the purposes of conducting a charge-air mass flow generated by the fresh-air compressor,
    a recuperation charger which has a compressor-turbine with a high-pressure side and a low-pressure side and has an electromechanical motor-generator coupled to the compressor-turbine,
    a blow-off line and an exhaust-gas discharge line, the exhaust gas discharge line being part of the exhaust-gas tract, and
    a plurality of valve devices coupled to one or more of the charge-air feed line, the recuperation charger, the fresh air supply device and the exhaust gas discharge line, wherein
    the compressor-turbine, on one side, on the low-pressure side thereof, is coupled both to the charge-air feed line and to the blow-off line, and, on the other side, on the high-pressure side of the compressor-turbine, is coupled both to the charge-air feed line and to the exhaust-gas discharge line in the exhaust-gas tract, by one or more of the plurality of valve devices, such that the recuperation charger is operable in a manner dependent on settings of the valve devices, at least firstly in a booster operating mode in a manner driven by the motor-generator as a compressor for increasing pressure of the charge-air mass flow in the charge-air feed line, and secondly in a recuperation operating mode in a manner driven as a turbine for energy recovery with the motor generator by at least a part of the charge-air mass flow, by at least a part of an exhaust-gas mass flow or by both the at least part of the charge-air mass flow and the at least part of the exhaust-gas mass flow.

2. The supercharging device as claimed in claim 1, wherein the valve devices comprises a first valve device and a second valve device and the supercharging device further comprises an exhaust-gas recirculation line, a low-pressure branch line and a high-pressure branch line,
    the low-pressure side of the compressor-turbine is connected, via the low-pressure branch line and the first valve device, to the charge-air feed line at a first charge-air branching point,
    the high-pressure side of the compressor-turbine is connected, via the high-pressure branch line and the second valve device, to the charge-air feed line at a second charge-air branching point downstream of the first charge-air branching point, the low-pressure branch line is connected, at a low-pressure branching point, via the first valve device or a further valve device to the blow-off line, the high-pressure branch line is connected, at a high-pressure branching point, via the exhaust-gas recirculation line and at least one third valve device to the exhaust-gas discharge line in the exhaust-gas tract at an exhaust-gas branching point, and the charge-air feed line is selectively shut off between the first charge-air branching point and the second charge-air branching point by the second valve device or at least one further valve device.

3. The supercharging device as claimed in claim 2, wherein the first valve device is a switching valve which is arranged at the low-pressure branching point, such that in a valve position with a shut-off passage from the first charge-air branching point to the low-pressure side of the compressor-turbine, a passage from the low-pressure side of the compressor-turbine to the blow-off line is open, and in a further valve position with an open passage from the first charge-air branching point to the low-pressure side of the compressor-turbine, a passage to the blow-off line is shut off.

4. The supercharging device as claimed in claim 2, wherein the second valve device is a switching valve which is arranged at the second charge-air branching point, such that in a valve position with a shut-off passage of the charge-air feed line to the intake side of the internal combustion engine and to the high-pressure branch line, a passage from the high-pressure branch line to the intake side of the internal combustion engine is open, in a first further valve position with an open passage of the charge-air feed line to the intake side of the internal combustion engine, a passage from the charge-air feed line to the high-pressure branch line is shut off, and in a second further valve position with a partially or fully open passage of the charge-air feed line to the high-pressure branch line, a passage of the charge-air feed line to the intake side of the internal combustion engine is partially or fully shut off.

5. The supercharging device as claimed in claim 2, wherein the at least one third valve device is a switching valve which is arranged at the high-pressure branching point, such that in a valve position with an open passage of the high-pressure branch line to the charge-air feed line, a passage from the exhaust-gas recirculation line to the high-pressure branch line is shut off, in a first further valve position with a shut-off passage of the high-pressure branch line to the charge-air feed line, a passage from the exhaust-gas recirculation line to the high-pressure branch line is open, and in a second further valve position, both the passage from the high-pressure branch line to the charge-air feed line and the passage from the exhaust-gas recirculation line to the high-pressure branch line are open.

6. The supercharging device as claimed in claim 2, further comprising a fourth switching valve arranged at the exhaust-gas branching point, and when at least a partially open passage exists from the exhaust-gas discharge line to the exhaust-gas recirculation line, a passage of the exhaust-gas discharge line downstream of the exhaust-gas branching point is at least partially shut off.

7. The supercharging device as claimed in claim 1, wherein the blow-off line is connected to the fresh-air supply device for recirculation of a blow-off mass flow into the fresh-air supply device.

8. The supercharging device as claimed in claim 1, further comprising one or more charge-air coolers arranged at one or more positions in the charge-air feed line upstream, downstream or both upstream and downstream of the compressor-turbine in the charge-air mass flow.

9. The supercharging device as claimed in claim 1, further comprising one or more exhaust-gas coolers arranged at one or more positions in the exhaust-gas recirculation line in the exhaust-gas mass flow.

10. The supercharging device as claimed in claim 1, wherein the compressor-turbine of the recuperation charger has a compressor-turbine housing with, and arranged therein, a fixed or variable guide blade arrangement for improving outflow behavior or inflow behavior of the charge-air mass flow, the exhaust-gas mass flow, or both the charge-air mass flow and the exhaust-gas mass flow.

11. The supercharging device as claimed in claim 1, wherein the supercharging device is configured, during operation, to be switched at least between a booster operating mode and a first recuperation operating mode in a manner dependent on operating behavior of the internal combustion engine and by the line connections, the valve devices and the motor-generator of the recuperation charger.

12. The supercharging device as claimed in claim 11, wherein the supercharging device is configured to be additionally switched into a standard operating mode and into further different recuperation operating modes which are direct from the first recuperation operating mode.

13. The supercharging device as claimed in claim 12, wherein the valve devices and the recuperation charger are set such that, to implement the standard operating mode, the charge-air mass flow is conducted from the high-pressure side of the fresh-air compressor via the charge-air feed line directly to the intake side of the internal combustion engine, and the motor-generator of the recuperation charger is switched into a neutral state, wherein the exhaust-gas mass flow is discharged entirely, unutilized, via the exhaust-gas discharge line.

14. The supercharging device as claimed in claim 12, wherein the valve devices and the recuperation charger are set such that, to implement a further recuperation operating mode, the charge-air mass flow is conducted from the high-pressure side of the fresh-air compressor at least partially to the high-pressure side of the compressor-turbine, is expanded across the compressor-turbine, and is introduced from the low-pressure side of the compressor-turbine back into the fresh-air supply device via the blow-off line, the motor-generator is switched into a generator operating mode so as to be driven by the compressor-turbine for purposes of energy recovery, and the exhaust-gas mass flow is discharged entirely, unutilized, via the exhaust-gas discharge line.

15. The supercharging device as claimed in claim 12, wherein the valve devices and the recuperation charger are set such that, to implement a further recuperation operating mode, the charge-air mass flow is conducted from the high-pressure side of the fresh-air compressor at least partially to the high-pressure side of the compressor-turbine, and at the same time, at least a part of the exhaust-gas mass flow is branched off from the exhaust-gas tract and conducted to the high-pressure side of the compressor-turbine, whereby a mixed mass flow of exhaust gas and charge air forms which is expanded across the compressor-turbine and which is blown off from the low-pressure side of the compressor-turbine via the blow-off line or conducted into the fresh-air supply device, wherein the motor-generator is switched into a generator operating mode so as to be driven by the compressor-turbine for purposes of energy recovery.

16. The supercharging device as claimed in claim 11, wherein the valve devices and the recuperation charger are set such that to implement the booster operating mode, the charge-air mass flow is conducted from the high-pressure side of the fresh-air compressor to the low-pressure side of the compressor-turbine, is compressed further by the compressor-turbine, and is conducted at elevated pressure from the high-pressure side of the compressor-turbine back into the charge-air feed line and to the intake side of the internal combustion engine, and the motor-generator is switched into a motor mode so as to drive the compressor-turbine for purposes of increasing pressure in the charge-air feed line, and to implement the first recuperation operating mode, the charge-air mass flow is conducted from the high-pressure side of the fresh-air compressor via the charge-air feed line directly to the intake side of the internal combustion engine, and at the same time, an exhaust-gas mass flow is branched off from the exhaust-gas tract and is conducted to the high-pressure side of the compressor-turbine and is expanded across the compressor-turbine and blown off from the low-pressure side of the compressor-turbine via the blow-off line or conducted into the fresh-air supply device, wherein the motor-generator is switched into a generator operating mode during the first recuperation operating mode so as to be driven by the compressor-turbine for purposes of energy recovery.

\* \* \* \* \*